(12) United States Patent  
Kawai

(10) Patent No.: US 8,153,284 B2  
(45) Date of Patent: Apr. 10, 2012

(54) METHOD FOR FABRICATING A GLASS SUBSTRATE, METHOD FOR FABRICATING A MAGNETIC DISK, AND MAGNETIC DISK

(75) Inventor: Hideki Kawai, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 482 days.

(21) Appl. No.: 11/825,784

(22) Filed: Jul. 9, 2007

(65) Prior Publication Data

US 2008/0014470 A1 Jan. 17, 2008

(30) Foreign Application Priority Data

Jul. 13, 2006 (JP) ................................ 2006-192952

(51) Int. Cl.
*G11B 5/62* (2006.01)
*B24B 1/00* (2006.01)
*C03C 15/00* (2006.01)

(52) U.S. Cl. ................. 428/846.9; 428/848.9; 360/135; 73/38; 73/573

(58) Field of Classification Search ............ 204/192.15, 204/191.2; 360/135, 75, 97.01, 97.02, 48; 428/848, 832, 141, 832.2, 848.1, 846.9, 848.9, 428/48, 64.2, 848.8; 438/692; 216/52; 430/270.12; 73/821, 105, 573, 38, 85; 473/282; 65/31; 501/65; 313/292; 522/71; 451/28, 41; 427/129

See application file for complete search history.

(56) References Cited

U.S. PATENT DOCUMENTS

| | | | |
|---|---|---|---|
| 6,048,466 A | | 4/2000 | Morizane et al. |
| 6,268,304 B1* | | 7/2001 | Maeda et al. ............. 428/848.1 |
| 6,365,059 B1* | | 4/2002 | Pechenik ........................ 216/52 |
| 6,395,412 B1* | | 5/2002 | Honda et al. .................. 428/141 |
| 2002/0015863 A1 | | 2/2002 | Nakajima et al. |
| 2002/0025451 A1* | | 2/2002 | Kokaku et al. |
| 2003/0060302 A1* | | 3/2003 | Rogers et al. ................. 473/282 |
| 2003/0094032 A1* | | 5/2003 | Baklanov et al. ................ 73/38 |
| 2003/0110707 A1* | | 6/2003 | Rosenflanz et al. ............ 501/65 |
| 2003/0137230 A1* | | 7/2003 | Martin et al. .............. 428/832.2 |
| 2003/0230112 A1* | | 12/2003 | Ikeda et al. .................... 428/832 |

(Continued)

FOREIGN PATENT DOCUMENTS

JP 05-314401 A 11/1993

(Continued)

OTHER PUBLICATIONS

Translation—Mitani et al (JP 2001-316133) Nov. 13, 2001.*

(Continued)

*Primary Examiner* — Kevin M. Bernatz
*Assistant Examiner* — Louis Falasco
(74) *Attorney, Agent, or Firm* — Brinks Hofer Gilson & Lione

(57) ABSTRACT

A method for manufacturing a glass substrate which has a uniform and minute pattern of stripes formed on the surface thereof by ultraprecision polishing, and which allows the recording capacity of a magnetic disk to be increased, includes an inspecting step before the glass substrate is subjected to ultraprecision polishing, whether the Young's modulus Es in topmost part as determined by the nanoindentation method and the Young's modulus Eg as determined by ultrasonic resonance fulfill the inequality $0.8\ Eg<Es<1.2\ Eg$; or the hardness Hs in topmost part as determined by the nanoindentation method and the Vickers hardness Hv fulfill the inequality $0.8\ Hv<Hs<1.2\ Hv$.

13 Claims, 2 Drawing Sheets

U.S. PATENT DOCUMENTS

| | | | |
|---|---|---|---|
| 2004/0180239 A1* | 9/2004 | Ikenishi et al. | 204/192.15 |
| 2004/0191436 A1* | 9/2004 | Wei et al. | 65/61 |
| 2004/0229444 A1* | 11/2004 | Couillard et al. | 360/135 |
| 2005/0103120 A1* | 5/2005 | Liu et al. | 73/821 |
| 2006/0000263 A1* | 1/2006 | Su et al. | 428/848 |
| 2006/0216552 A1* | 9/2006 | Ikenishi et al. | 360/75 |
| 2006/0287408 A1* | 12/2006 | Baikerikar et al. | 522/71 |
| 2007/0082294 A1* | 4/2007 | Goto et al. | 360/97.01 |
| 2007/0113629 A1* | 5/2007 | Lohmiller et al. | 73/85 |
| 2007/0151340 A1* | 7/2007 | Hsu et al. | 360/48 |

FOREIGN PATENT DOCUMENTS

| | | |
|---|---|---|
| JP | 2000-086301 A | 3/2000 |
| JP | 2000-105916 | 4/2000 |
| JP | 2001-312817 | 11/2001 |
| JP | 2001-316133 A | 11/2001 |
| JP | 2002-030275 | 1/2002 |
| JP | 2004-107788 | 4/2004 |
| JP | 2005-129163 | 5/2005 |
| WO | WO 99/45537 A1 | 9/1999 |
| WO | WO 2004/039738 * | 5/2004 |
| WO | 2006012854 * | 2/2006 |
| WO | WO 2006/049561 * | 5/2006 |
| WO | WO 2006/052060 * | 5/2006 |

OTHER PUBLICATIONS

Translation—Toshitomo et al (JP 2000-086301) Mar. 28, 2000.*
Translation—Toyoguchi (JP 2000-105916) Apr. 11, 2000.*
Translation—Baba et al (JP 05-314401) May 6, 1992.*
International Search Report in International Application No. PCT/JP2007/062869 dated Aug. 7, 2007, 2 pages.

* cited by examiner

METHOD FOR FABRICATING A GLASS SUBSTRATE, METHOD FOR FABRICATING A MAGNETIC DISK, AND MAGNETIC DISK

This application is based on Japanese Patent Application No. 2006-192952 filed on Jul. 13, 2006, the contents of which are hereby incorporated by reference.

BACKGROUND OF THE INVENTION

1. Field of the Invention

The present invention relates to a glass substrate, and more particularly to a glass substrate for use in a magnetic disk.

2. Description of Related Art

Conventionally, as substrates for magnetic disks, there have generally been used aluminum substrates in stationary devices such as desktop computers and servers, and glass substrates in portable devices such as notebook computers and mobile computers. One disadvantage with aluminum substrates is that they are easy to deform and are not hard enough, offering not quite satisfactory smoothness on the substrate surface after polishing. Another disadvantage is that, if a magnetic head happens to touch a magnetic disk, the magnetic film on an aluminum substrate is prone to exfoliate from the substrate. Under this background, it is expected that glass substrates, less prone do deformation, offering better surface smoothness, and affording higher mechanical strength, will be increasingly used not only in portable but also in stationary devices and in other home information appliances.

Generally, a magnetic disk is fabricated by polishing the surface of a glass substrate into a mirror surface, then treating the surface by ultraprecision polishing, and then forming a magnetic layer on the glass substrate by, for example, sputtering. Here, ultraprecision polishing is achieved by, for example, texturing—whereby a pattern of stripes in the shape of concentric circles is formed on the glass substrate surface by polishing using tape—or by mirror polishing—which gives priority to further improving the smoothness on the polished surface while leaving a less conspicuous pattern of stripes. In a magnetically anisotropic recording medium, texturing gives a magnetic disk medium magnetic anisotropy; this improves the magnetic characteristics thereof as a magnetic disk, and also prevents attraction between a magnetic head and the surface of the magnetic disk when a hard disk drive is out of operation. On the other hand, in an isotropic medium such as a perpendicular magnetic disk, mirror polishing greatly improves the smoothness on the substrate surface; this gives the magnetic layer formed on the substrate a fine, uniform structure, and offers greatly improved magnetic recording characteristics. Generally, texturing or mirror polishing of a glass substrate is achieved in the following manner: while a texturing liquid having abrasive particles dispersed in water or a solution containing water as a main ingredient thereof is supplied to the glass substrate surface, polishing cloth or polishing tape of a woven or non-woven fabric or the like is pressed against the glass substrate surface, and the glass substrate is moved.

The recording capacity of a magnetic disk can be increased by reducing the distance between the surface thereof and a magnetic head. Inconveniently, however, with a reduced distance between a magnetic head and the surface of a magnetic disk, if there is an abnormal projection formed on or foreign matter adhered to the surface of a glass substrate, the magnetic head collides with the projection or foreign matter.

Thus, to make it possible to increase the recording capacity of a magnetic disk by reducing the distance from the surface thereof to a magnetic head, it is necessary to eliminate formation of abnormal projections on the surface of a glass substrate, and to form a more uniform and minute pattern of stripes.

In this connection, for example, JP-A-2002-030275 proposes the use of a special texturing liquid for the purpose of forming a uniform and minute pattern of stripes. On the other hand, JP-A-2005-129163, though not directly aiming at improving the effect of ultraprecision polishing, discloses giving the surface layer of a glass substrate a coarse structure with a view to improving the toughness of an information recording glass substrate, alleviating a lowering in strength due to micro-cracks, and reducing the incidence of cracks on collision with a magnetic head.

Inconveniently, however, in actual fabrication, even when glass substrates of the same composition are treated by ultraprecision polishing using the same treatment liquid, the pattern of stripes in the shape of concentric circuits formed on the glass substrates occasionally varies slightly from lot to lot.

Variations in the pattern of stripes on the surface of glass substrates lead to variations in the magnetic characteristics in the magnetic disks formed therewith, and this is undesirable in practical terms.

SUMMARY OF THE INVENTION

In view of the above described problem, it is an object of the present invention to provide a method for fabricating a glass substrate having a uniform and minute pattern of stripes formed on the surface thereof by ultraprecision polishing.

It is another object of the present invention to provide a magnetic disk that allows the recording capacity thereof to be increased through a reduction of the distance between a magnetic head and the surface of the magnetic disk, and to provide a method for fabricating such a magnetic disk.

The inventors of the present invention have intensively studied possible mechanisms that cause the pattern of stripes in the shape of concentric circles formed on the surface of glass substrates to vary slightly from lot to lot even when glass substrates of the same composition are treated by ultraprecision polishing using the same treatment liquid. Through the study, the inventors have discovered that fine structure of a glass substrate at the surface thereof affects a pattern of formed stripes thereon, and this discovery has led to the present invention. Specifically, a glass substrate having a fine surface structure allows a uniform and minute pattern of stripes to be formed thereon by ultraprecision polishing; in contrast, a glass substrate having a coarse surface structure causes a non-uniform pattern of stripes to be formed thereon by ultraprecision polishing.

No reasonable explanation has up to now been given for the cause of variations in the fineness in topmost part of a glass substrate before ultraprecision polishing. It is, however, supposed to be because, when a glass substrate is cleaned before ultraprecision polishing, its surface is eroded by the cleaning liquid, such as a weakly alkaline liquid or hydrofluoric acid, exerting a slight etching effect.

According to a first aspect of the present invention, a method for fabricating a glass substrate includes steps of: polishing the surface of the glass substrate; and inspecting the glass substrate after the polishing of the surface thereof to see whether or not a predetermined inequality is fulfilled by a predetermined property value in topmost part of the glass substrate as determined by nanoindentation method and the same property value as determined by another measurement method.

According to a second aspect of the present invention, in the method according to the first aspect described above, the predetermined property value is a Young's modulus Es, the same property value as determined by the other measurement method is a Young's modulus Eg determined by ultrasonic resonance, and the predetermined inequality is formula (1) below:

$$0.8\ Eg < Es < 1.2\ Eg. \tag{1}$$

According to a third aspect of the present invention, in the method according to the first aspect described above, the predetermined property value is a hardness Hs, the same property value as determined by the other measurement method is a hardness Hv determined by the Vickers method, and the predetermined inequality is formula (2) below:

$$0.8\ Hv < Hs < 1.2\ Hv. \tag{2}$$

According to a fourth aspect of the present invention, the method according to the first aspect described above further includes a step of cleaning the surface of the glass substrate with a cleaning liquid exerting an etching effect between the polishing step and the inspecting step.

According to a fifth aspect of the present invention, in the method according to the fourth aspect described above, the cleaning liquid is hydrofluoric acid.

According to a sixth aspect of the present invention, the method according to the first aspect described above further includes a step of performing ultraprecision polishing on the glass substrate when the glass substrate has passed the inspecting step.

According to a seventh aspect of the present invention, in the method according to the sixth aspect described above, the topmost surface of the glass substrate has a surface roughness Ra of 0.3 nm or less after ultraprecision polishing.

According to an eighth aspect of the present invention, in the method according to the first aspect described above, the glass substrate contains 50% or more by weight of $SiO_2$.

According to a ninth aspect of the present invention, a method for fabricating a magnetic disk includes a step of forming a magnetic recording layer on a glass substrate fabricated by the method according to the sixth aspect described above.

According to a tenth aspect of the present invention, a magnetic disk is fabricated by the method according to the ninth aspect described above.

With the method for fabricating a glass substrate, the method for fabricating a magnetic disk, and the magnetic disk according to the present invention, before ultraprecision polishing, the Young's modulus Es in topmost part as determined by the nanoindentation method and the Young's modulus Eg. as determined by ultrasonic resonance fulfill inequality (1) below, or the hardness Hs in topmost part as determined by the nanoindentation method and the Vickers hardness Hv fulfill inequality (2) below. This gives the glass substrate a fine, stable surface condition, and allows a uniform and minute pattern of stripes to be formed on the glass substrate surface by texturing. The uniform and minute pattern of stripes so formed on the glass substrate gives the magnetic disk formed therewith uniform magnetic characteristics. Also in cases where an ultrasmooth surface is formed by mirror polishing, it is possible to obtain a uniform and smooth surface all over the glass substrate. By making the surface of the glass substrate extremely smooth and uniform, it is possible to obtain uniform, low-noise magnetic characteristics with the magnetic disk formed therewith.

$$0.8\ Eg < Es < 1.2\ Eg. \tag{1}$$

$$0.8\ Hv < Hs < 1.2\ Hv. \tag{2}$$

Giving the glass substrate a surface roughness Ra of 0.3 nm or less after ultraprecision polishing makes it possible to reduce the distance between the surface of the magnetic disk formed therewith and a magnetic head, and thus to increase the recording capacity of the magnetic disk. Using a glass substrate containing 50% or more by weight of $SiO_2$ allows a uniform and minute pattern of stripes to be formed on the glass substrate by texturing, and allows the glass substrate to be given an extremely smooth and uniform surface condition by mirror polishing.

With the fabrication method according to the present invention, the use of the glass substrate described above allows a pattern of stripes to be formed uniformly and minutely on the glass substrate by texturing, and allows the glass substrate surface to be made extremely smooth and uniform by mirror polishing.

DETAILED DESCRIPTION OF PREFERRED EMBODIMENTS

Figure 2:
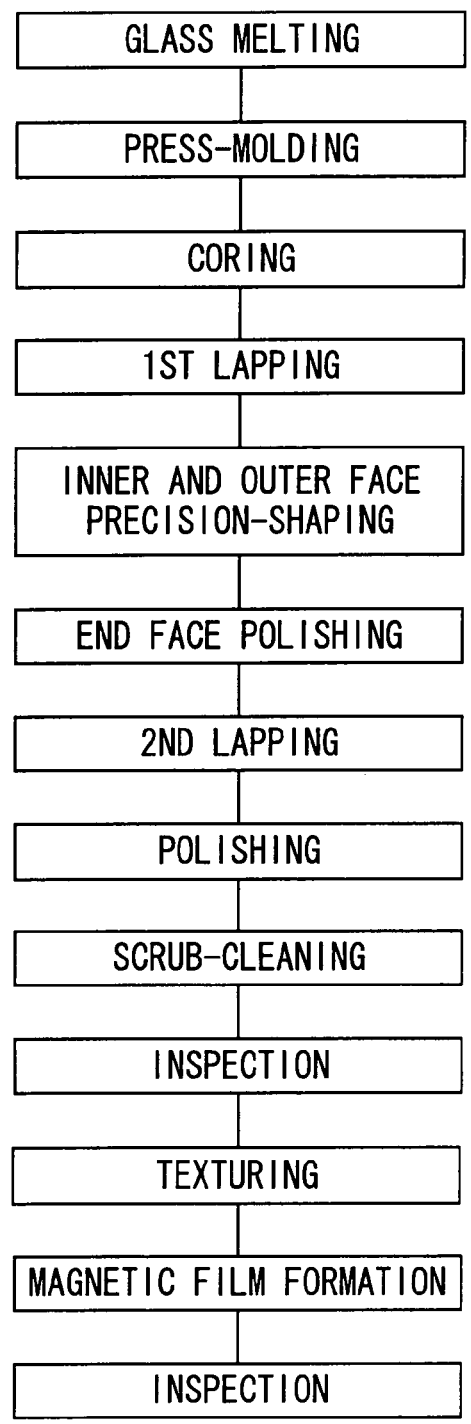
FIG. 2 is a diagram to show an example of a process for fabricating a magnetic disk according to the present invention.

Hereinafter, a method for fabricating a magnetic disk which uses a method for fabricating a glass substrate according to the present invention will be described. FIG. 2 shows an example of the process for fabricating the magnetic disk. First, a glass material is melted (a glass melting step). The melted glass is then poured into a lower mold, and is then molded by being pressed with an upper mold into a disk-shaped glass substrate precursor (a press-molding step). Here, the disk-shaped glass substrate precursor may be formed, instead of by press-molding, by cutting it with an abrasive grindstone out of sheet glass formed, for example, by down-drawing or floating.

There is no particular restriction on the material of the glass substrate of the present invention. Examples of the material include: soda-lime glass, of which the main ingredients are silicon dioxide, sodium oxide, and calcium oxide; aluminosilicate glass, of which the main ingredients are silicon dioxide, aluminum oxide, and $R_2O$ (where R=K, Na, Li); borosilicate glass; lithium oxide-silicon dioxide glass; lithium oxide-aluminum oxide-silicon dioxide glass; R'O-aluminum oxide-silicon dioxide glass (where R'=Mg, Ca, Sr, Ba). Any of these glass materials may have zirconium oxide, titanium oxide, or the like added thereto.

There is no particular restriction on the size of the glass substrate. The method of the present invention is applicable to 2.5-inch, 1.8-inch, 1-inch, and 0.85-inch disks and even disks with smaller diameters, and to 2 mm thick, 1 mm thick, and 0.63 mm thick disks and even disks with smaller thicknesses.

As necessary, in a central portion of the press-molded glass substrate precursor, a hole is formed with a core drill or the like (a coring step). Then, in a first lapping step, the surface of the glass substrate on both sides is ground, and thereby the overall shape of the glass substrate is preliminarily adjusted in terms of the parallelism, flatness, and thickness thereof. Next, the outer and inner circumferential edge faces of the glass substrate are ground and chamfered, and thereby fine adjustments are made in the exterior dimensions and roundness of the glass substrate, the inner diameter of the hole, and the concentricity between the glass substrate and the hole (an inner and outer face precision-shaping step). Then, the outer and inner circumferential edge faces of the glass substrate are polished to remove minute scratches and the like (an end face polishing step).

Next, the surface of the glass substrate on both sides is ground again, and thereby fine adjustments are made in the parallelism, flatness, and thickness of the glass substrate (a second lapping step). Then, the surface of the glass substrate on both sides is polished, and thereby the surface irregularities on the glass substrate surface are leveled (a polishing step). As necessary, the surface of the glass substrate on both sides may be further polished with an abrasive with a different grain size (a second polishing step).

The glass substrate is then cleaned, and is thereafter inspected to see whether or not it fulfills the inequality (1) or (2) noted above.

In this embodiment, measurement of the Young's modulus Es and the hardness Hs by the nanoindentation method is conducted using a "SPI3800N" scanning probe microscope manufactured by Seiko Instruments Inc., with a "TriboScope" manufactured by Hysitron Inc. attached thereto. Specifically, while the load on the probe is varied from 0.1 μN to 5 μN in 0.1 μN steps, measurement data are collected until the probe is pressed into a sample to a depth of over 100 nm. The Young's modulus in topmost part is calculated from the load curve observed as the probe is pressed into the sample to a depth of 100 nm. Adopted as the hardness Hs in topmost part is the hardness measured when the load on the probe is 1 μN. Here, it should be noted that the probe may be pressed into the sample to any depth other than 100 nm so long as the depth is considered to be within topmost part of the sample as appropriately defined.

Measurement of the Young's modulus Eg by ultrasonic resonance is conducted using a "DEM-11R" dynamic elasticity modulus tester manufactured by Kyoto Electronics Manufacturing Co., Ltd. Specifically, a sample for evaluation cut to the size of 60×20×1.0 mm is prepared, then the resonance frequency thereof is measured in the range from 800 Hz to 2000 Hz, and then, from the measured result, the Young's modulus is automatically calculated. Measurement of the Vickers hardness Hv is conducted using a "HM-113" micro hardness tester manufactured by Akashi Corp. Specifically, a sample having the surface thereof polished into a mirror surface with cerium oxide abrasive is prepared, then a Vickers probe is pressed into the sample at a load of 100 g for duration of 15 seconds, and then the resulting indentation is measured.

In a glass substrate according to a first embodiment of the present invention, as one indicator that indicates the fineness of topmost part of the glass substrate, the Young's modulus there is used. That is, the fineness of the surface structure of the glass substrate is evaluated based on the Young's modulus in topmost part of the glass substrate relative to the Young's modulus of the glass substrate as a whole.

Specifically, the Young's modulus Eg measured by ultrasonic resonance is regarded as the Young's modulus of the glass substrate as a whole, and the Young's modulus Es measured by the nanoindentation method is regarded as the Young's modulus of topmost part of the glass substrate; here, as discovered by the inventors of the present invention, a proper range of the Young's modulus Es in topmost part of the glass substrate is from 0.8 times to 1.2 times the Young's modulus Eg of the glass substrate as a whole. If the Young's modulus Es in topmost part of the glass substrate is 0.8 or less times the Young's modulus Eg of the glass substrate as a whole, the surface structure of the glass substrate is so coarse that the glass substrate is brittler than its structure intrinsically is, making the pattern of stripes formed by texturing partly disturbed thus non-uniform. On the other hand, if the Young's modulus Es in topmost part of the glass substrate is 1.2 or more times the Young's modulus Eg of the glass substrate as a whole, the surface structure of the glass substrate is so fine and hard that it is difficult to form a uniform pattern of stripes by texturing. A more preferable range of the Young's modulus Es in topmost part of the glass substrate is from 0.82 times to 1.18 times the Young's modulus Eg of the glass substrate as a whole.

Figure 1:
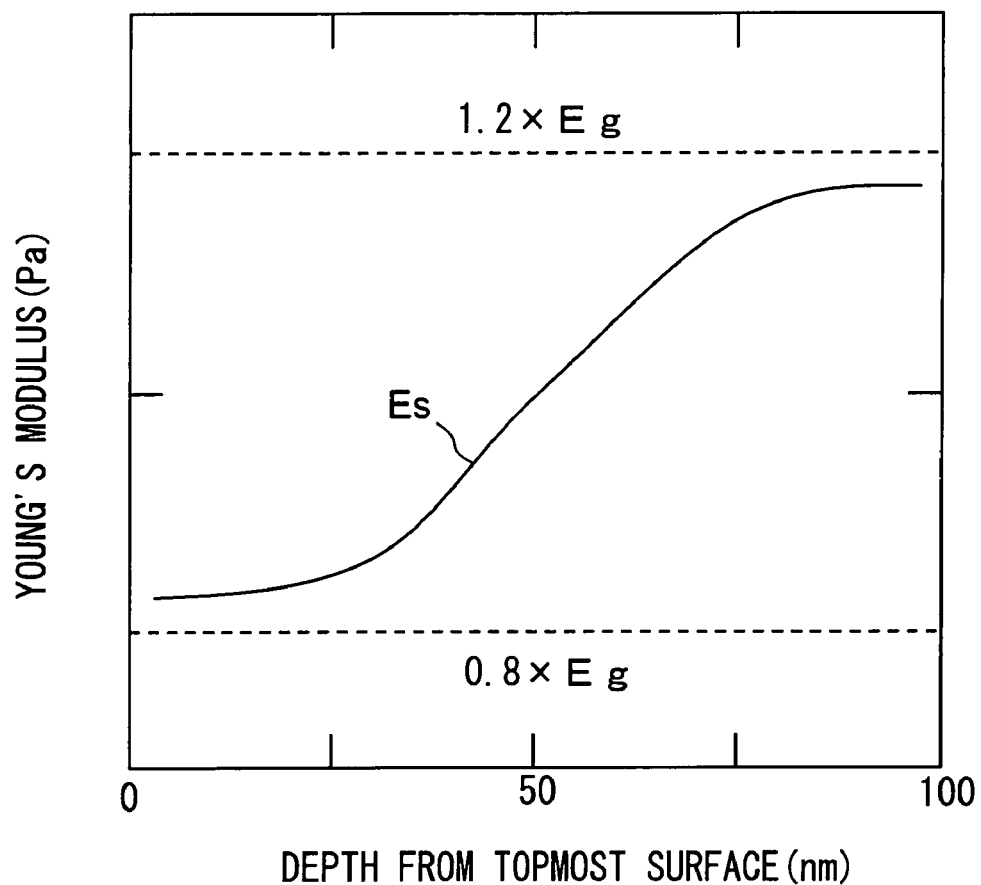
FIG. 1 is a diagram to show an example of results of measurement of Young's modulus by the nanoindentation method.

FIG. 1 shows the Young's modulus Es measured by the nanoindentation method, with the horizontal axis representing the Young's modulus and the vertical axis representing the depth from the surface. In this figure, the Young's modulus Es is smallest at the very surface, and becomes increasingly high as one goes deeper from the surface. As shown here, what is important in the present invention is that the Young's modulus Es in topmost part of the glass substrate is in the range from 0.8 times to 1.2 times the Young's modulus Eg of the glass substrate as a whole.

In a glass substrate according to a second embodiment of the present invention, as another indicator that indicates the fineness of topmost part of the glass substrate, the hardness there is used. That is, the fineness of the surface structure of the glass substrate is evaluated based on the hardness in topmost part of the glass substrate relative to the hardness of the glass substrate as a whole.

Specifically, the hardness Hv measured by the Vickers method is regarded as the hardness of the glass substrate as a whole, and the hardness Hs measured by the nanoindentation method is regarded as the hardness of topmost part of the glass substrate; here, as discovered by the inventors of the present invention, a proper range of the hardness Hs in topmost part of the glass substrate is from 0.8 times to 1.2 times the hardness Hv of the glass substrate as a whole. If the hardness Hs in topmost part of the glass substrate is 0.8 or less times the hardness Hv of the glass substrate as a whole, as described above in connection with the differently measured Young's moduli, the glass substrate surface is so coarse that a non-uniform pattern of stripes is formed by ultraprecision polishing. On the other hand, if the hardness Hs in topmost part of the glass substrate is 1.2 or more times the hardness Hv of the glass substrate as a whole, the glass substrate surface is so fine and hard that it is difficult to form a pattern of stripes by ultraprecision polishing. A more preferable range of the hardness Hs in topmost part of the glass substrate is from 0.85 times to 1.15 times the hardness Hv of the glass substrate as a whole.

When the glass substrate passes the inspection, it is then subjected to ultraprecision polishing. Performed as ultraprecision polishing here is texturing, mirror polishing, or any other conventionally known similar treatment. Here, an ultraprecision polishing liquid is used that has abrasive particles dispersed evenly in a liquid in a way that the abrasive particles do not precipitate while the liquid is in storage; specifically, used as such an ultraprecision polishing liquid is slurry having about 0.01% to 5% by weight of abrasive particles dispersed in a water solution containing about 1% to 25% by weight of a glycol compound surfactant such as polyethylene glycol or polypropylene glycol.

An example of the abrasive particles is monocrystalline or polycrystalline diamond particles. Diamond particles have a regular particles shape, have a uniform particle size and shape, are hard, and are excellently resistant to chemicals and heat. In particular, polycrystalline diamond particles have, compared with monocrystalline counterparts, a more round particle shape, with rounded corners, and are widely used as abrasive particles for ultraprecision polishing.

It is preferable that, after ultraprecision polishing, the topmost surface of the glass substrate have a surface roughness Ra of 0.3 nm or less. In the magnetic disk as an end product, a surface roughness larger than 0.3 nm here makes it impossible to reduce the distance between a magnetic head and the surface of the magnetic disk, and thus to increase the recording capacity of the magnetic disk.

Next, on the glass substrate fabricated as described above, a magnetic film is formed. The magnetic film can be formed by a conventionally known method, for example, by spin-coating the substrate with a thermosetting resin having magnetic particles dispersed therein, by sputtering, or by electroless plating. Spin-coating provides a film thickness of about 0.3 μm to 1.2 μm, sputtering provides a film thickness of about 0.04 μm to 0.08 μm, and electroless plating provides a film thickness of about 0.05 μm to 0.1 μm. To reduce the film thickness and to obtain a high density, it is preferable to adopt sputtering or electroless plating.

There is no particular restriction on the material of the magnetic film; it may be any conventionally known magnetic material. To obtain a high coercivity, it is suitable to use, for example, an alloy of Co that is based on Co, having high crystal anisotropy, and that has Ni or Cr added thereto to adjust the residual flux density. Specifically, examples of such magnetic materials containing Co as a main ingredient thereof include: CoPt, CoCr, CoNi, CoNiCr, CoCrTa, CoPtCr, CoNiPt, CoNiCrPt, CoNiCrTa, CoCrPtTa, CoCrPtB, and CoCrPtSiO. To reduce noise, the magnetic film may be divided with a non-magnetic film (e.g., Cr, CrMo, or CrV) to have a multiple-layer structure (e.g., CoPtCr/CrMo/CoPtCr, CoCrPtTa/CrMo/CoCrPtTa). Other than the magnetic materials mentioned above, it is also possible to use: a ferrite material; an iron-rare earth metal material; or a granular material having magnetic particles of Fe, Co, FeCo, CoNiPt, or the like dispersed in a non-magnetic film of $SiO_2$, BN, or the like. The magnetic film may be for either of the longitudinal and perpendicular types of recording.

For smoother sliding of a magnetic head, a thin coat of a lubricant may be applied to the surface of the magnetic film. An example of the lubricant is perfluoropolyether (PFPE), a liquid lubricant, diluted with a solvent of the Freon family or the like.

As necessary, an underlayer or a protective layer may additionally be provided. In a magnetic disk, what underlayer to provide is determined to suit the magnetic film. The material of the underlayer is, for example, one or more selected from the group of non-magnetic metals including Cr, Mo, Ta, Ti, W, V, B, Al, and Ni. With a magnetic film containing Co as a main ingredient thereof, it is preferable to use the simple substance of or an alloy of Cr. The underlayer is not limited to one having a single layer, but may be one having a multiple-layer structure having a plurality of layers of the same material or of different materials laid on one another. Examples of multiple-layer underlayers include: Cr/Cr, Cr/CrMo, Cr/CrV, NiAl/Cr, NiAl/CrMo, and NiAl/CrV.

Examples of protective layers for preventing wear and corrosion of the magnetic film include: a Cr layer, a Cr alloy layer, a carbon layer, a carbon hydride layer, a zirconia layer, and a silica layer. Any of these protective layers can be formed continuously with the underlayer, the magnetic film, etc. on in-line sputtering equipment. Any of those protective layers may be provided in a single layer, or more than one of them, of the same material or of different material, may be provided in multiple layers. In addition to, or instead of, this or these protective layers, another protective layer may be formed. For example, instead of the above protective layers, a silicon dioxide ($SiO_2$) layer may be formed by applying to the top of the Cr layer minute particles of colloidal silica dispersed in tetraalkoxysilane diluted with a solvent of the alcohol family and then baking the applied layer.

PRACTICAL EXAMPLE 1

An aluminosilicate glass substrate having a Young's modulus Eg of 85 GPa and containing 55% of $SiO_2$ was polished and cleaned so that the Young's modulus Es of the part of the glass substrate from the surface to 100 nm deep ranged from 75 GPa, at the minimum, to 82 GPa, at the maximum. Incidentally, polishing and cleaning do not change the Young's modulus Eg. When texturing was then performed all over the surface of the glass substrate, a uniform pattern of stripes in the shape of concentric circles was obtained. When a magnetic film was then formed on this glass substrate, a uniform magnetic alignment in the shape of concentric circles was observed, and good magnetic recording/reproducing characteristics were obtained.

PRACTICAL EXAMPLE 2

A soda-lime glass substrate having a Young's modulus Eg of 78 GPa and containing 65% of $SiO_2$ was polished and cleaned so that the Young's modulus Es of the part of the glass substrate from the surface to 100 nm deep ranged from 88 GPa, at the minimum, to 92 GPa, at the maximum. When mirror polishing was then performed on the glass substrate, an ultrasmooth surface having a roughness of Ra=0.15 nm was obtained uniformly all over the surface thereof. When a perpendicular magnetic film was then formed on this glass substrate, a film of minute and uniform magnetic particles was obtained, and good magnetic signal reproduction characteristics were obtained.

PRACTICAL EXAMPLE 3

A non-alkali glass substrate having Vickers hardness Hv of 630 and containing 50% of $SiO_2$ was polished and cleaned so that the hardness Hs at the topmost surface of the glass substrate was 575. Incidentally, polishing and cleaning do not change the Vickers hardness Hv. When mirror polishing was then performed on the glass substrate, an ultrasmooth surface having a roughness of Ra=0.15 nm was obtained uniformly all over the surface thereof. When a perpendicular magnetic film was then formed on this glass substrate, a film of minute and uniform magnetic particles was obtained, and good magnetic signal reproduction characteristics were obtained.

PRACTICAL EXAMPLE 4

An aluminoborosilicate glass substrate having Vickers hardness Hv of 550 and containing 60% of $SiO_2$ was polished and cleaned so that the hardness Hs at the topmost surface of the glass substrate was 625. When texturing was then performed on the glass substrate, a uniform pattern of stripes in the shape of concentric circles was obtained all over the surface. When a magnetic film was then formed on this glass substrate, a uniform magnetic alignment in the shape of concentric circles was observed, and good magnetic recording/reproducing characteristics were obtained.

COMPARATIVE EXAMPLE 1

An aluminosilicate glass substrate having a Young's modulus Eg of 85 GPa and containing 55% of $SiO_2$ was polished and cleaned so that the Young's modulus Es of the part of the glass substrate from the surface to 100 nm deep ranged from 65 GPa, at the minimum, to 68 GPa, at the maximum. When texturing was then performed all over the surface of the glass substrate, a pattern of stripes in the shape of concentric circles was obtained, but the width, depth, and density of the stripes were non-uniform. When a magnetic film was then formed on this glass substrate, the magnetic layer had a partly disturbed magnetic alignment, and magnetic noise was large, resulting in unsatisfactory magnetic characteristics.

COMPARATIVE EXAMPLE 2

A soda-lime glass substrate having a Young's modulus Eg of 78 GPa and containing 65% of $SiO_2$ was polished and cleaned so that the Young's modulus Es of the part of the glass substrate from the surface to 100 nm deep ranged from 95 GPa, at the minimum, to 102 GPa, at the maximum. Then mirror polishing was performed on the glass substrate to make it smooth, but the obtained smoothness was unsatisfactory, with Ra=0.45 nm, and the roughness varied from part to part. When a perpendicular magnetic film was then formed on this glass substrate, the magnetic particles were unsatisfactorily minute, and large interference noise was observed among particles; thus, it was impossible to obtain magnetic signal reproduction characteristics good enough to obtain the desired recording density.

COMPARATIVE EXAMPLE 3

A non-alkali glass substrate having Vickers hardness Hv of 630 and containing 50% of $SiO_2$ was polished and cleaned so that the hardness Hs at the topmost surface of the glass substrate was 780. Then mirror polishing was performed on the glass substrate to make it smooth, but the obtained smoothness was unsatisfactory, with Ra=0.43 nm, and the roughness varied from part to part. When a perpendicular magnetic film was then formed on this glass substrate, the magnetic particles were unsatisfactorily minute, and large interference noise was observed among particles; thus, it was impossible to obtain magnetic signal reproduction characteristics good enough to obtain the desired recording density.

COMPARATIVE EXAMPLE 4

An aluminoborosilicate glass substrate having Vickers hardness Hv of 550 and containing 60% of $SiO_2$ was polished and cleaned so that the hardness Hs at the topmost surface of the glass substrate was 420. When texturing was then performed on the glass substrate, a pattern of stripes in the shape of concentric circles was obtained, but the width, depth, and density of the stripes were non-uniform, with part of the stripes completely destroyed. When a magnetic film was then formed on this glass substrate, the magnetic layer had a partly disturbed magnetic alignment, and magnetic noise was large, resulting in unsatisfactory magnetic characteristics.

What is claimed is:

1. A method for fabricating a glass substrate comprising:
    polishing a surface of a glass substrate;
    inspecting the glass substrate after the polishing of the surface thereof to determine whether or not a predetermined inequality is fulfilled by a first value of a predetermined property in a topmost part of the glass substrate as determined by a nanoindentation method and a second value of said predetermined property as determined by another measurement method; and
    performing ultraprecision polishing on the glass substrate when the glass substrate has passed the inspecting process, wherein the predetermined property is a Young's modulus and wherein the first value is denoted by Es and the second value is denoted by Eg, wherein the another measurement method is ultrasonic resonance, and the predetermined inequality is given by a formula below:

$$0.8\ Eg < Es < 1.2\ Eg.$$

2. A method for fabricating a glass substrate comprising:
    polishing a surface of a glass substrate;
    inspecting the glass substrate after the polishing of the surface thereof to determine whether or not a predetermined inequality is fulfilled by a first value of a predetermined property in a topmost part of the glass substrate as determined by a nanoindentation method and a second value of said predetermined property as determined by another measurement method; and
    performing ultraprecision polishing on the glass substrate when the glass substrate has passed the inspecting process, wherein the predetermined property is a hardness and wherein the first value is denoted by Hs and the second value is denoted by Hv, wherein the another measurement method is a Vickers method, and the predetermined inequality is given by a formula below:

$$0.8\ Hv < Hs < 1.2\ Hv.$$

3. The method according to claim 1, further comprising cleaning the surface of the glass substrate with a cleaning liquid exerting an etching effect between the polishing process and the inspecting process.

4. The method according to claim 3, wherein the cleaning liquid is hydrofluoric acid.

5. The method according to claim 1, wherein, the topmost surface of the glass substrate has a surface roughness Ra of 0.3 nm or less after the ultraprecision polishing.

6. The method according to claim 1, wherein the glass substrate contains 50% or more by weight of $SiO_2$.

7. A method for fabricating a magnetic disk, comprising:
    fabricating a glass substrate comprising:
        polishing a surface of a glass substrate; and
        inspecting the glass substrate after the polishing of the surface thereof to determine whether or not a predetermined inequality is fulfilled by a first value of a predetermined property in a topmost part of the glass substrate as determined by a nanoindentation method and a second value of said predetermined property as determined by another measurement method; and
        performing ultraprecision polishing on the glass substrate when the glass substrate has passed the inspecting process; and
    forming a magnetic recording layer on the ultraprecision polished glass substrate, wherein the predetermined property value is a Young's modulus, wherein the first value is denoted by Es and the second value is denoted by Eg, and wherein the another measurement method is ultrasonic resonance, and the predetermined inequality is given by a formula below:

$$0.8\ Eg < Es < 1.2\ Eg.$$

8. A magnetic disk fabricated by the method according to claim 7.

9. The method according to claim 2, further comprising cleaning the surface of the glass substrate with a cleaning liquid exerting an etching effect between the polishing process and the inspecting process.

10. The method according to claim 9, wherein the cleaning liquid is hydrofluoric acid.

11. The method according to claim 2, wherein, the topmost surface of the glass substrate has a surface roughness Ra of 0.3 nm or less after the ultraprecision polishing.

12. The method according to claim 2, wherein the glass substrate contains 50% or more by weight of $SiO_2$.

13. A method of fabricating a magnetic disk, comprising:
fabricating a glass substrate by:
polishing a surface of the glass substrate;
inspecting the glass substrate after the polishing of the surface thereof to determine whether or not a predetermined inequality is fulfilled by a first value of a predetermined property in a topmost part of the glass substrate as determined by a nanoindentation method and a second value of said predetermined property as determined by another measurement method;
performing ultraprecision polishing on the glass substrate when the glass substrate has passed the inspecting process; and
forming a magnetic recording layer on the ultraprecision polished glass substrate, wherein the predetermined property value is a hardness, wherein the first value is denoted by Hs and the second value is denoted by Hv, and wherein the another measurement method is a Vickers method, and the predetermined inequality is given by a formula below:

$0.8\ Hv < Hs < 1.2\ Hv.$

* * * * *